(12) United States Patent
Shields

(10) Patent No.: US 9,851,019 B2
(45) Date of Patent: Dec. 26, 2017

(54) DEVICE AND METHOD FOR VALVE SIGNATURE TESTING

(71) Applicant: Fluke Corporation, Everett, WA (US)

(72) Inventor: James Dennis Shields, Snohomish, WA (US)

(73) Assignee: Fluke Corporation, Everett, WA (US)

( * ) Notice: Subject to any disclaimer, the term of this patent is extended or adjusted under 35 U.S.C. 154(b) by 617 days.

(21) Appl. No.: 14/474,032

(22) Filed: Aug. 29, 2014

(65) Prior Publication Data
US 2016/0061349 A1    Mar. 3, 2016

(51) Int. Cl.
*G01M 15/00* (2006.01)
*F16K 37/00* (2006.01)

(52) U.S. Cl.
CPC .............. *F16K 37/0083* (2013.01)

(58) Field of Classification Search
CPC ........... G05B 2219/25428; G05B 2219/31211; G05B 2219/33326; G05B 2219/33331; E21B 2034/002; E21B 23/04; E21B 34/10; E21B 41/00
See application file for complete search history.

(56) References Cited

U.S. PATENT DOCUMENTS

| | | | | |
|---|---|---|---|---|
| 5,970,430 A * | 10/1999 | Burns | ................ | G05B 19/0425 700/117 |
| 7,370,520 B2 * | 5/2008 | Kortsen | ............... | F02M 65/003 73/114.51 |
| 8,868,354 B2 * | 10/2014 | Lohmann | ........... | G05B 19/0428 702/105 |
| 2013/0327403 A1 * | 12/2013 | Jensen | ................... | F16K 31/12 137/1 |

FOREIGN PATENT DOCUMENTS

| | | |
|---|---|---|
| DE | 103 51 105 A1 | 7/2005 |
| WO | 97/05417 A1 | 2/1997 |
| WO | 2013/184863 A1 | 12/2013 |

OTHER PUBLICATIONS

"Assessing control valves and their performance," Fluke, Feb. 2014, retrieved from http://en-us.fluke.com/community/fluke-news-plus/calibration/Assessing-control-valves-and-their-performance.html, on Feb. 17, 2016, 3 pages.
"FAQ: What is HART?" and "FAQ: How is WirelessHART Similar to 4-20mA HART?," FieldCommGroup, 2014, retrieved from http://en.hartcomm.org/hcp/tech/faq/faq.html, on Feb. 17, 2016, 3 pages.
(Continued)

*Primary Examiner* — Elias Desta
(74) *Attorney, Agent, or Firm* — Seed IP Law Group LLP

(57) ABSTRACT

Systems and methods for testing a valve using valve signatures are provided. An analytical device receives a first valve signature from a portable measurement device. The portable measurement device obtains the first valve signature by causing a plurality of control signals to be applied to the valve and receiving data representing actual positions of the valve corresponding to the applied control signals. The analytical device may generate an image including a graphical representation of the first valve signature and a second valve signature that was measured prior to or after the first valve signature.

24 Claims, 5 Drawing Sheets

(56) References Cited

OTHER PUBLICATIONS

"ICoT™ 5300: Intelligent Positioner w/ Hart® Capability," Westlock Valve Monitoring and Control Products Datasheet for ICoT 5300, retrieved from http://www.thevalveshop.com/menu/access/westlock/icot.html, on Feb. 17, 2016, 4 pages.

"The new HART of a technician's toolkit," Fluke 709H Loop Calibrator, Fluke, Jun. 2013, retrieved from http://en-us.fluke.com/community/fluke-news-plus/calibration/the-new-hart-of-a-technicians-toolkit.html, on Feb. 17, 2016, 4 pages.

Extended European Search Report for corresponding EU application No. EP 15 18 2994, dated Jan. 1, 2016, 8 pages.

\* cited by examiner

DEVICE AND METHOD FOR VALVE SIGNATURE TESTING

BACKGROUND

Control valves are used in a wide range of processes. Control valves may open and close proportionally and vary the degree of travel depending on the applied control signal. Valve positioners may be incorporated into a control valve that help ensure that the valve is at a desired position of opening or "travel" for the applied control signal. Processes that use control valves may be negatively impacted by a faulty or malfunctioning control valve or valve positioner.

Performing diagnostics or testing on control valves and valve positioners may require removal of the valve from the process, which can cause process delays or require a process shutdown. Some valve devices have a travel indicator that allows a technician to visually observe an amount of travel when in operation. Some valve positioners can output a position of the valve as feedback in response to an applied control signal. A set of valve positions and the corresponding control signals is known as a "valve signature." A graphical representation of the valve signature can be useful in assessing various characteristics of a valve. Collecting valve signature data using currently available technology can be a time consuming process requiring several different test tools.

Moreover, interpreting a valve signature can require extensive training and experience in valve signature analysis. A highly-trained, experienced technician may have difficulty diagnosing a valve using a valve signature because a valve signature may vary depending on the application and process parameters such as flow, pressure, temperature, and valve settings, among others. This problem is further compounded due to various different types of valves being used in industry, and each valve may have a unique valve signature. A graphical representation of a valve signature having a particular shape may reflect a malfunction for one valve and a functional valve for another. In addition, some valves and valve positioners that simply need to be recalibrated appear to be malfunctioning, leading to an unnecessary replacement.

In view of the above, there exists a need for improved systems and methods for obtaining and using a valve signature to test a valve.

SUMMARY

The following summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system of one or more computers can be configured to perform particular operations or actions by virtue of having software, firmware, hardware, or a combination of them installed on the system that, in operation, causes or cause the system to perform the operations or actions.

A general aspect described herein includes a method of testing a valve. In at least one embodiment, the method may include receiving first valve signature data for the valve corresponding to a measurement time, where the first valve signature data is derived from a predetermined sequence of control signals caused to be input to the valve by a portable measurement device. Other embodiments of this aspect include corresponding computer systems, apparatus, and computer programs recorded on one or more computer storage devices, each configured to perform the actions of the method.

Implementations of the method may include one or more of the following features. The method may further include generating an image including a graphical representation of the first valve signature data and a graphical representation of second valve signature data. The graphical representation of the first valve signature data and the graphical representation of the second valve signature data may be overlaid on one another in a display. The second valve signature data may include valve signature data measured prior to the measurement time. The second valve signature data may include a valve signature for the valve when the valve is calibrated. The method may further include determining whether the valve has a fault at the measurement time based on a comparison of the first valve signature data and the second valve signature data. The method may further include calibrating the valve prior to receiving the first valve signature.

The predetermined sequence of control signals may correspond to at least one of an opening and a closing of the valve. The method may further include determining whether the valve is calibrated based on a comparison of the first valve signature data and the second valve signature data. The second valve signature data may include one of an initial measured valve signature for the valve. The method may also include an average of previously measured valve signatures of the valve.

In a system aspect, the portable measurement device may further be configured to compare the first valve signature data with one or more calibration threshold parameters. The portable measurement device may also be configured to measure third valve signature data by causing a plurality of control signals to be input to the valve and reading valve positions corresponding to the plurality of control signals. The portable measurement device may be configured to transmit the first valve signature data to an analytical device. The analytical device may be remotely located from the portable measurement device. Some valves are normally open, others are normally closed. The plurality of control signals may be configured to set a position of the valve to about 0% open, and then incrementally change the position of the valve to about 100% open, and then incrementally change the position of the valve back to about 0% open. Alternatively, the plurality of control signals may be configured to set a position of the valve to about 100% open and then incrementally change the position of the valve to about 0% open, and then incrementally change the position of the valve back to about 100% open.

The analytical device may further be configured to determine that the valve has a fault based on a comparison of the first valve signature data and the second valve signature data that was measured prior to the first valve signature data. A storage of the analytical device may include a set of valve signature data corresponding to a plurality of different measurements for the valve, where each valve signature data in the set corresponds to a measurement performed at a different time. The second valve signature data may be selected from the set of valve signature data in response to a user input.

The analytical device may be configured to generate an image that includes a graphical representation of the first valve signature data and the second valve signature data. The analytical device may be configured to be a portable device. The portable measurement device may be configured to output a prompt to calibrate the valve based on a measured preliminary valve signature data and one or more predetermined calibration threshold parameters. Implementations of the described techniques may include hardware, a method or process, or computer software on a computer-accessible medium.

A general aspect described herein includes a system for testing a valve. In at least one embodiment, the system may include a portable measurement device configured to measure first valve signature data by causing a plurality of control signals to be input to the valve and reading valve positions corresponding to the plurality of control signals. The system may also include an analytical device configured to receive the first valve signature data. Other embodiments of this aspect include corresponding computer systems, apparatus, and computer programs recorded on one or more computer storage devices, each configured to perform the actions of the methods described herein.

Implementations of the system may include one or more of the following features. The portable measurement device may be configured to compare the first valve signature data with one or more calibration threshold parameters. The portable measurement device may be configured to measure third valve signature data by causing a plurality of control signals to be input to the valve and reading valve positions corresponding to the control signals. The portable measurement device may be configured to transmit the first valve signature data to the analytical device. The analytical device may be remotely located from the portable measurement device. The plurality of control signals may be configured to set a position of the valve to about 0% open, and then incrementally change the position of the valve to about 100% open, and then incrementally change the position of the valve back to about 0% open. Alternatively, the plurality of control signals may be configured to set a position of the valve to about 100% open and then incrementally change the position of the valve to about 0% open, and then incrementally change the position of the valve back to about 100% open.

The analytical device may further be configured to determine that the valve has a fault based on a comparison of the first valve signature and the second valve signature that was measured prior to the first valve signature. A storage of the analytical device may include a set of valve signature data corresponding to a plurality of different measurements for the valve, where each valve signature data in the set corresponds to a measurement performed at a different time. The second valve signature data may be selected from the set of valve signature data in response to a user input. The analytical device may be configured to generate an image that includes a graphical representation of the first valve signature data and the second valve signature data. The analytical device may be configured to be a portable device. The portable measurement device may be configured to output a prompt to calibrate the valve based on a preliminary measurement of valve signature data and one or more predetermined calibration threshold parameters. Implementations of the foregoing described techniques may include hardware, a method or process, or computer software on a computer-accessible medium.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
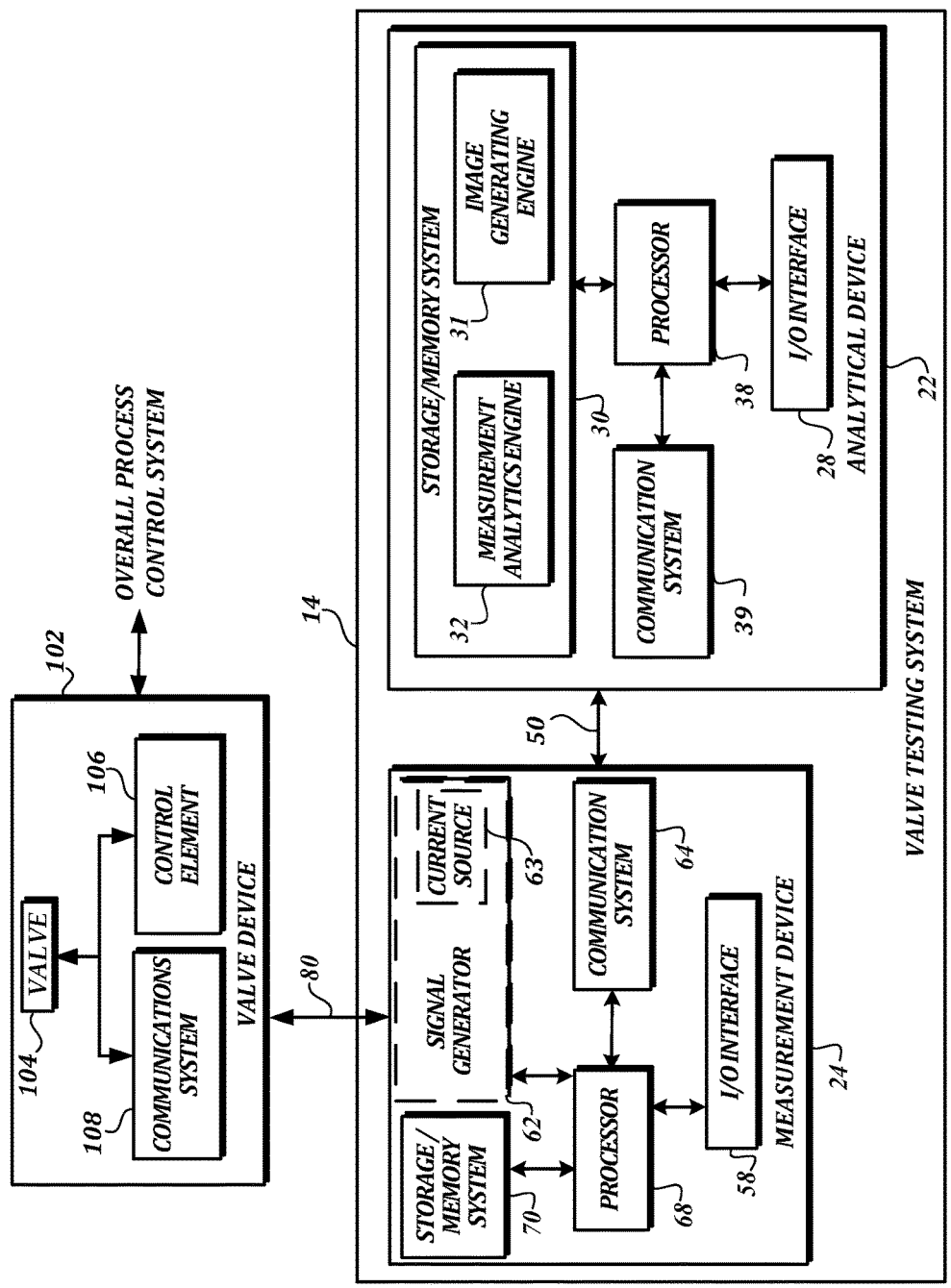
FIG. 1 is a block diagram of a valve testing system comprising an analytical device in communication with a measurement device in accordance with one or more embodiments of the present disclosure.

The detailed description set forth below in connection with the appended drawings, where like numerals reference like elements, provides a description of various embodiments of the disclosed subject matter and is not intended to represent the only embodiments. Each embodiment described in this disclosure provides merely an example or illustration which should not be construed as preferred or advantageous over other embodiments. The illustrative examples provided herein are not intended to be exhaustive or to limit the claimed subject matter to the precise forms disclosed.

The following discussion provides examples of systems, apparatus, and methods that relate to testing a valve using valve signature data. In various embodiments, an analytical device may communicate with one or more measurement devices for obtaining, measuring, testing, and analyzing valve signature data. A measurement device may apply control signals to a valve that cause a position of the valve to change. In various embodiments, valve signature data is obtained by measuring the position of the valve in response to application of the control signals to the valve. The measurement device may prompt a user to calibrate the valve based on the measured values. Measurement applications executed by the analytical device may, for example, cause the analytical device to receive valve signature data from the measurement device or directly from a valve device, generate images that include plotted or other graphical representations of valve signature data, perform calculations based on stored, measured, or received valve signature data (e.g., in graph form), compare valve signature data measured at different times, and perform other functionality. According to various embodiments, when different valve signature data or updated valve signature data is received, the device may perform new calculations and/or generate at least one new or updated image, as appropriate. In addition, the valve signature data may be modified to include different valve signature data in response to a user selection. In some embodiments, a measurement application executed by the analytical device may determine that a valve has a fault or it may compare current valve signature data with previously measured valve signature data and provide related calculations. The user may be alerted if a fault is determined.

Prior to discussing the details of various aspects of the present disclosure, it should be understood that aspects of the following description may be presented in terms of logic and operations that may be performed by electronic components. These electronic components, which may be grouped in a single location or distributed over a wide area, generally include controllers, microcontrollers, control units, processors, microprocessors, etc. While the present disclosure describes logic in terms of instructions carried out by a processor, it will be appreciated by one skilled in the art that any logic described herein may be implemented in a variety of configurations, including but not limited to hardware, software, and combinations thereof. The hardware may include but is not limited to, analog circuitry, digital circuitry, processing units, field-programmable gate array (FPGA), application specific integrated circuits (ASICs), and the like, and combinations thereof. In circumstances in which the components of the system are distributed, the components are accessible to each other via communication links.

Furthermore, in general, functionality of devices described herein may be implemented in computing logic embodied in hardware or software instructions, which can be written in a programming language, such as assembly language, C, C++, COBOL, JAVA™, PHP, Perl, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a storage medium) or computer storage device and be stored on, read, and executed by one or more general-purpose or special-purpose processors.

Turning now to FIG. 1, there is shown one example of a valve testing system 14 implementing one or more aspects of the present disclosure. As shown in FIG. 1, the system 14 comprises an analytical device 22 that is communicatively coupleable over path 50 to a measurement device 24. As shown, the measurement device 24 is coupleable to a valve device 102 over path 80. Paths 50 and 80, as well as other paths shown in the present disclosure, may be a wireless or a wired path. As discussed in more detail herein, path 80 enables control signals from the valve testing system 14 to be applied to the valve device 102 and corresponding valve position information to be read or obtained from the valve device 102.

The measurement device 24 depicted in FIG. 1 includes an I/O interface 58, a communications system 64, a processor 68, and a storage/memory system 70 that may be coupled with one another. The I/O interface 58 may include a user interface. The measurement device 24 may include or be coupled to a device for performing various measurements, such as a loop or clamp for measuring electrical current or a multimeter device. The I/O interface 58 may include inputs for receiving test leads for measuring resistance or voltage, for example. The measurement device 24 may include a display or it may be coupleable to a display.

In general, the measurement device 24 is configured to measure or obtain parameters related to the valve device 102. For example, the measurement device 24 may be configured to measure data corresponding to at least one electrical or mechanical valve parameter, including, but not limited to a voltage, a current, a valve position such as % open or % closed, as well as any calculated value or any data derived from the at least one electrical or mechanical parameter. Obtaining parameters may involve reading valve positions or other valve information output by the valve device 102. The measurement device 24 may also measure other parameters including, but not limited to, voltage, current, temperature, relative humidity, decibels, magnetic field, flow velocity, moisture, rotations per minute, pressure, distance, light, contact infrared, and/or any calculated value derived from a primary measurement, such as wattage, power quality, crest factor, and duty cycle, for example, and without limitation.

In some embodiments, the measurement device 24 includes a signal generator 62. The signal generator 62 is configured to generate control signals that may be provided to the valve device 102. The signal generator 62 includes a current source 63 capable of sourcing current of different current levels. In some embodiments, a voltage source (not shown) is included in the measurement device 24. The voltage source is configured to provide control signals having different voltage levels. The voltage source may be provided instead of, or in addition to, the current source 63. In some embodiments, the signal generator 62 automatically generates a plurality of control signals in a predetermined sequence. Such control signals may be generated in response to an input received from a user, e.g., via the I/O interface 58.

In some embodiments, the valve measurement system 14 is configured to provide a sequence of control signals of varying amplitude of current that incrementally step from, for example, slightly below 4 mA to slightly above 20 mA and then back down to slightly below 4 mA. For example, the current source 63 may provide a plurality of control signals from 3.7 mA to 20.7 mA in increments of 0.1, 0.2, 0.5, or 1 mA, for example and without limitation. In some embodiments, there are 16 steps or current levels ranging from about 4 mA to 20 mA. In some embodiments, there are 1600 steps or current levels ranging from about 4 mA to 20 mA. In some embodiments, the number of steps between the 4 mA level and the 20 mA level may be specified by the user.

The measurement device 24 is configured to obtain a valve signature. For embodiments described herein, a "valve signature" refers to data that includes applied control signal values and values representing corresponding actual positions (or "travel") of the valve body of the valve 104 or other element of the valve 104 for the applied control signals. The actual valve positions may be in units of % open or % closed or may reflect an actual position or length of travel, such as 5 mm, for example. The control signals included in the valve signature may be control signals generated by the signal generator 62. In addition, the measurement device 24 may associate, with the valve signature, information related to the valve signature. For example, the measurement device 24 may identify the technician performing the measurement, the type of device or the particular device used to perform the measurement, and the type or particular valve device being measured, respectively. The measurement device 24 may automatically associate some or all of this related information with the obtained valve signature. Collectively, the obtained valve signature and the related information, if any, may be referred to as "valve signature data."

The communication system 64 of the measurement device 24 includes suitable communication electronics for communicating with the analytical device 22 as well as the valve device 102. For example, the communication system 64 may include appropriate communication electronics for communicating with the valve device 102 using a first communication protocol and with the analytical device 22 using a second communication protocol. In some embodiments, the measurement device 24 and the analytical device 22 are communicatively coupled via wired connection such as a Universal Serial Bus (USB) connection. In some embodiments, data may be transferred by manually removing a removable storage (e.g., a SD card or memory stick) from the measurement device 24 and inserting the removable storage in the analytical device 22.

The analytical device 22 includes an I/O interface 28, a storage/memory system 30, a processor 38, and a communication system 39 that are communicatively coupled to one another. The I/O interface 28 may include a user interface, for example. The analytical device 22 may include a display or it may be coupleable to a display that may be used to display information such as a valve signature image. The storage/memory system 30 is generally configured to store valve measurement data such as valve signatures and related information. The storage/memory system 30 may also include an image generating engine 31 and a measurement analytics engine 32. The communication system 39 is configured to communicate with the communications system 64 of the measurement device 24 over path 50 and may be configured to communicate with other devices.

The analytical device 22 is generally configured to receive measurement data such as the data discussed above in connection with the measurement device 24 and including valve signature data. The analytical device 22 may store the measurement data in the storage/memory system 30. In addition, the storage/memory system 30 may include valve signature data such as a "baseline" valve signature for the valve device 102. The storage/memory system 30 may include parameters that may be used to analyze valve signature data, such as, but not limited to, expected valve signature data and/or threshold valve signature data. In some embodiments, the parameters included in the storage/memory system 30 are used to determine a fault in the valve device 102, or determine if the valve device 102 is calibrated appropriately.

The analytical device 22 may be configured to receive and use valve signature data, such as a valve identifier for the valve, a time that the electrical or mechanical parameter was measured, a technician identifier that identifies at least one technician that performed the measurement, or one or more error codes or alert events generated by the valve device or the measurement device. Such other data may be generated or obtained, for example, using the measurement device 24, the valve device 102, or the analytical device 22.

In some embodiments, the valve signature data received by the analytical device 22 may be formatted as an image that includes a graphical representation of the valve signature. This graphical representation of the valve signature may be, for example, a plot of valve positions for applied control signals. The image may include a valve identifier for the valve, a time that the electrical or mechanical parameter was measured, a technician identifier that identifies at least one technician who performed the measurement, or one or more error codes or alert events generated by the valve device or the measurement device in a textual format, for example. Such an image may be generated by the measurement device 24 or the image generating engine 31 of the analytical device 22.

The analytical device 22 may be embodied as a tablet computer, laptop computer, desktop, or smartphone, for example and without limitation. In some embodiments, the measurement device 24 and the analytical device 22 are embodied as a single device. Alternatively, the measurement device 24 and the analytical device 22 may be separate devices that, in some embodiments, are attachable to one another. When the analytical device 22 and the measurement device 24 are embodied as a single device or attached, the communications systems 39 and 64, storage/memory systems 30 and 70, and I/O interfaces 28 and 58 may be combined, structurally or logically. Using an analytical device 22 and a measurement device 24 that are separable from one another may provide advantages. For example, a first technician may take measurements and transmit the measurement to a second technician more skilled at analyzing the measurements. In addition, separate or separable devices allow for the second technician and the analytical device 22 to be located remotely from the first technician. This allows the second technician to review valve signature data in a location that is more convenient for reviewing valve signature data. For example, it may be desirable to review valve signature data using a high definition display located in a control room. Such a display may be unsuitable for use in the field.

In some embodiments, the measurement device 24 and/or the analytical device 22 are configured as a portable device. A portable device is a device that may, among other things, be capable of being transported relatively easily by a technician. A portable device can provide significant advantages. For example, a technician may use a single measurement device to measure and test multiple valve devices located at one or more worksites, which reduces equipment costs. In addition, valve devices located in tight spaces may be accessed more conveniently with a portable device.

In some embodiments, the measurement device 24 and/or the analytical device 22 are configured to be a handheld device. A handheld device is a device that is capable of being held in a hand of a technician while performing a function. A handheld device may allow the technician to use a free hand to make other measurements or adjustments to a valve device 102 while testing the valve device. For example, the measurement device 24 may be configured to take resistance readings using probes in order to troubleshoot a valve while measuring a valve signature. The testing probes could be positioned with the free hand of a technician using a handheld measurement device 24.

Although only one measurement device 24 is shown in FIG. 1 for ease of illustration, the analytical device 22 may be configured for communication with multiple measurement devices 24. Similarly, although only one valve device 102 is shown in FIG. 1 for ease of illustration, the analytical device 22 may be configured to receive, process, and analyze data pertaining to multiple valve devices 102.

The valve device 102 may be part of a process control system and include a wide range of different types of valves. The valve 104 may be, for example, a soft seat valve, globe valve, single-port valve, reverse double-ported globe-style valve, three-way valve bodies with or without a balanced valve plug, diaphragm valve, rotary valve, butterfly valve, sliding cylinder valve, directional control valve, spool valve, piston valve, or a flanged angle-style control valve. The valve device 102 may be adapted and used to control process conditions such as flow, pressure, temperature, and liquid level, for example. The valve device 102 may include a valve 104 and a communication system 108 that are coupled to one another. The valve device 102 may also include a control element 106.

In various embodiments, the control element 106 is a device capable of relating an input control signal with a valve position. A valve positioner is an example of a control element. The control element 106 may include a control unit, such as PIC controller, for example. The control element 106 monitors or senses the position of the valve or the valve body and provides control signals to the valve 104 or an actuator or otherwise causes the position of the valve 104 to be adjusted. The control element 106 may cause the position of the valve or the valve body to be adjusted. The valve device 102 may be a "smart device" and be configured to output an actual position of the valve 104.

It will be appreciated that the control element 106 or communications system 108 may be physically separate from the valve 104 or incorporated into a common housing with the valve 104. The valve 104 includes an actuator and a valve body. The actuator is responsive to control signals and is configured to move the valve in an "open" or "closed" direction. The actuator may include, for example, an electrical, hydraulic, or pneumatic-type actuator.

The communication system 108 may output or communicate signals or values representing the actual position of the valve 104 to the measurement device 24 over path 80. The communication system 108 may output the position signals or values as an analog signal, digital signal, or both. The communication system 108 may be adapted to utilize a wide array of communication protocols such as Highway Addressable Remote Transducer (HART) Communication Protocol, HART wireless, Fieldbus, Profibus, or other currently known or later developed protocols. The HART Communication Protocol, for example, can provide for simultaneous analog and digital communication over two wires. In some embodiments, the system 14 and the valve device 102 communicate using a wireless HART protocol, which does not require a wired connection. For example, the actual position values output by the valve device may be represented by an analog current signal of 4 to 20 mA or a digital HART variable that represents 0 to 100 percent of control valve operating span.

In some representative embodiments, the HART Communication Protocol is used and the path 80 includes two electrically distinct wires. Control signals and actual valve position values may be communicated between the valve device 102 and the measurement device 24 via the two or more electrically distinct wires.

Figure 3:
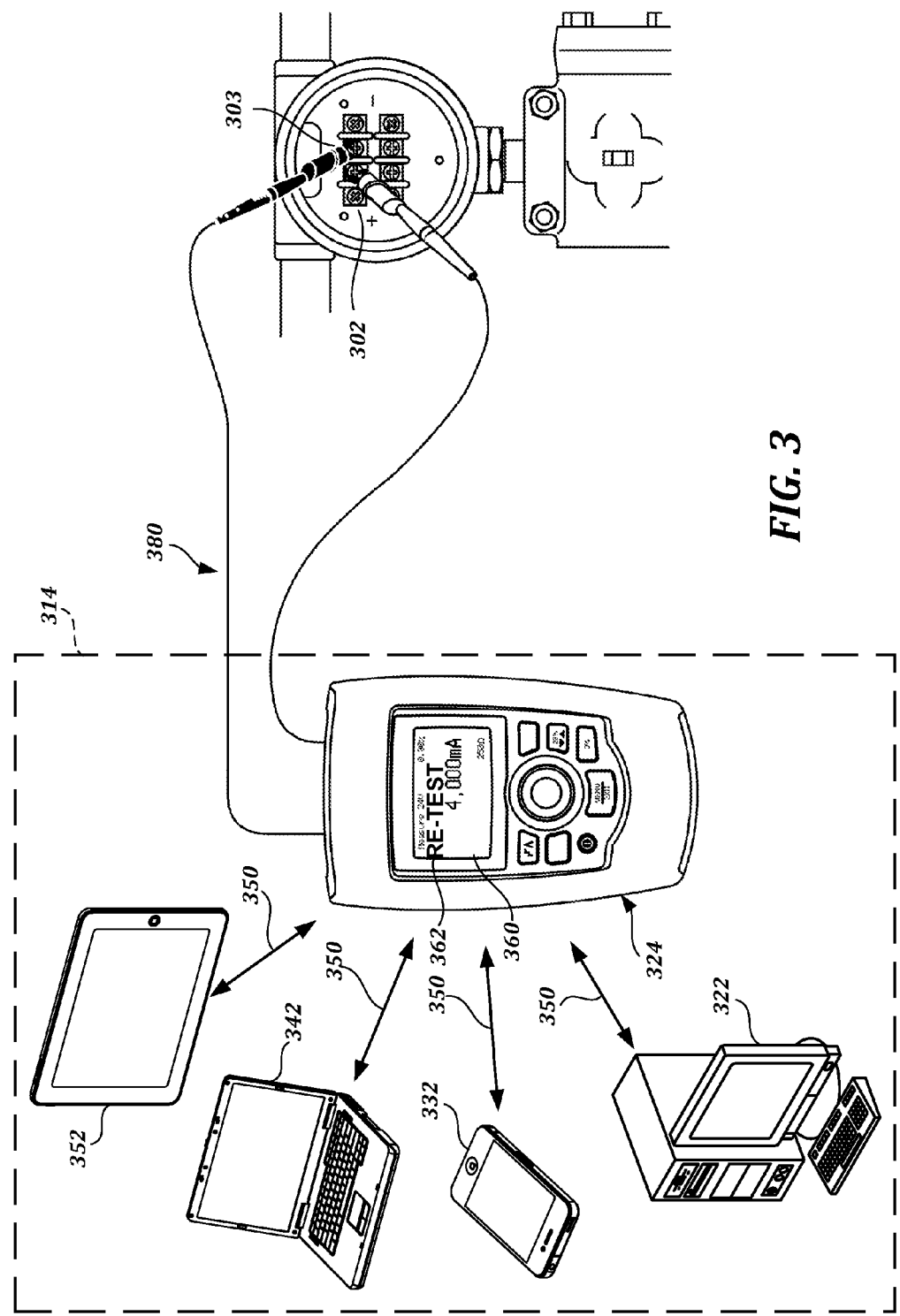
FIG. 3 is an example of portable measurement device coupled to a valve device in accordance with one or more embodiments of the present disclosure.

FIG. 3 illustrates a representative valve testing system 314 in operation. The valve testing system 314 includes a measurement device 324 that is connected to one or more analytical devices embodied as a desktop computer 322, smartphone 332, laptop 342, or tablet computer 352. In some embodiments, a single analytical device, such as the desktop computer 322, is used. The measurement device 324 is coupled to a valve device 302 over path 380. As shown, path 380 includes two wires coupled to test leads 303. Path 380 may also include a wireless path. The measurement device 324 provides control signals over path 380 that adjust the valve device 302 to different positions. Position signals indicative of the actual positions of the valve for the applied control signals are output from the valve device 302 to the measurement device 324. Such position signals may be communicated, for example, over path 380. The measurement device 324 is thus configured to measure the valve signature of the valve device 302. In various embodiments, a display 360 may include an alert 362, e.g., to instruct the user to re-measure or re-test the valve device 302. Such an alert may be generated using a process 200 as discussed below, for example.

The desktop computer 322 may be located in a control room or central location on the worksite and may receive valve signature data from a plurality of measurement devices 324 via path 350. In some embodiments, a plurality of measurement devices 324 may be used by technicians to simultaneously measure various valve devices 302 and communicate the results to the desktop computer 322.

Figure 6:
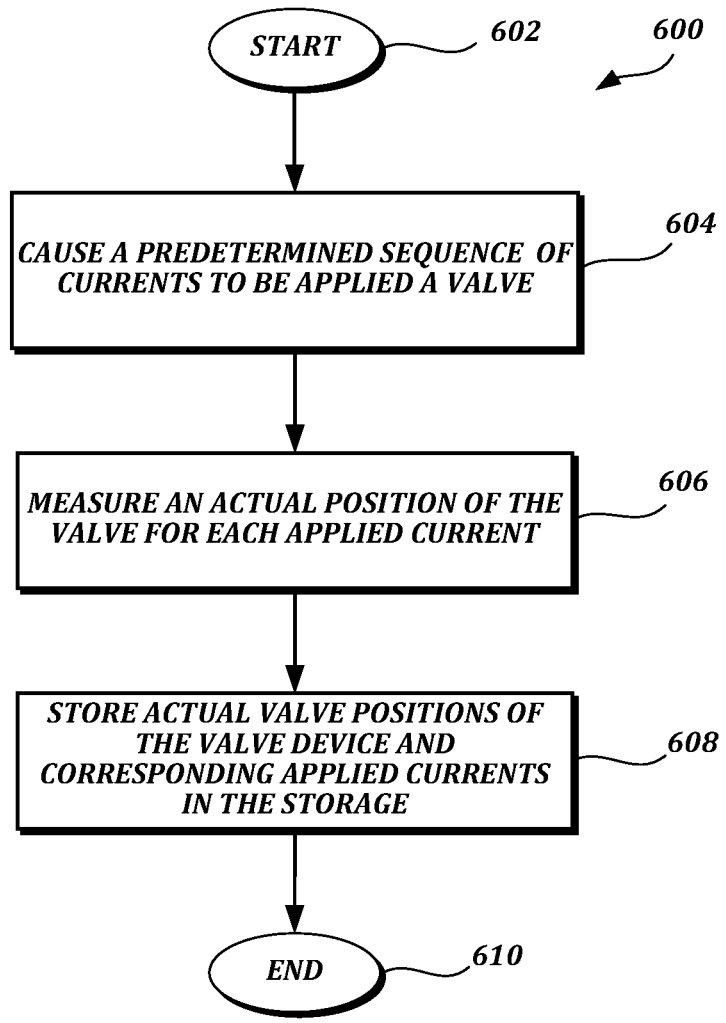
FIG. 6 is a flowchart diagram that depicts an example technique for obtaining a valve signature in accordance with one or more embodiments of the present disclosure.

FIG. 6 provides a flow diagram of a method 600 for measuring or deriving data valve signature data. The method 600 is suitable for use with a measurement device 24 when coupled to the valve device 102. The method 600 begins at block 602. At block 604, a predetermined sequence of current signals having varying amplitude levels is caused to be applied to the valve device 102. For example, the measurement device 24 may cause a plurality of current signals that have been generated by a signal generator to be applied to the valve device 102 over a wired connection.

At block 606, an actual position of the valve device 102 is measured or read for each applied current signal. The sequence of current signals and the corresponding position of the valve is collected as valve signature data. At block 608, the current signals and the corresponding measured positions are stored in the storage/memory system 70 of the measurement device 24. At block 610, the process 600 ends.

In operation, the control element 106 of the valve device 104 outputs position information representative of an actual position of the valve 104 as feedback in response to application of a control signal to the valve 104. The outputted position information may be obtained by the measurement device 24 using communication system 64, for example. Control signals may be provided sequentially to the control element 106. In some embodiments, the control signals range from 4 mA to 20 mA and are provided sequentially from 4 mA to 20 mA, and then in some embodiments, back to 4 mA. These control signals may be configured to move the valve 104 to various positions from an open position (e.g., 100% open) to a closed position (e.g., 0% open) or vice-versa. For example, the measurement device 24 may provide a sequence of control signals that are configured to move the valve (or valve body) to a sequence of positions from the 100% open to the 0% open position. The measurement device 24 may further provide additional control signals to move the valve (or valve body) from the 0% open position back to a 100% open position. It will be understood that this array of control signals may not move the valve 104 from 100% open to 0% open, if the valve is malfunctioning or faulty.

It may be desirable to obtain data for both an opening and closing of the valve because the frictional forces may be different. The positions achieved corresponding to the 0%-100%-0% cycle will reflect both opening and closing friction forces. In some embodiments, the measurement device 24 applies the control signals in a reverse order, e.g., the control signals are configured to move the valve from a 0% open position to a 100% open position and then the control signals may return the valve to a 0% open position. In some embodiments, the measurement device 24 is configured to generate an image based on the measured valve signature. Such an image may be a graphical representation of the control signals and the corresponding valve position.

In some embodiments, a current or voltage source is included within or coupled to the valve device 102 and is configured to provide control signals to the valve device 102. Such a voltage or current source may be controllable by the control element 106 or the measurement device 24. For example, the measurement device 24 may generate digital control signals and transmit them to the valve device 102. The valve device 102 converts the digital control signals into analog control signals that are then provided to an actuator that adjusts the position of the valve 104.

Using the system 14 to diagnose valve fault conditions may include: (1) setup of the valve device under test; (2) measurement of the valve device under test; and (3) diagnosis of the valve device under test. The measurement device 24 or the analytical device 22 may walk the user through at least part of the method in an easy-to-understand manner.

Figure 2:
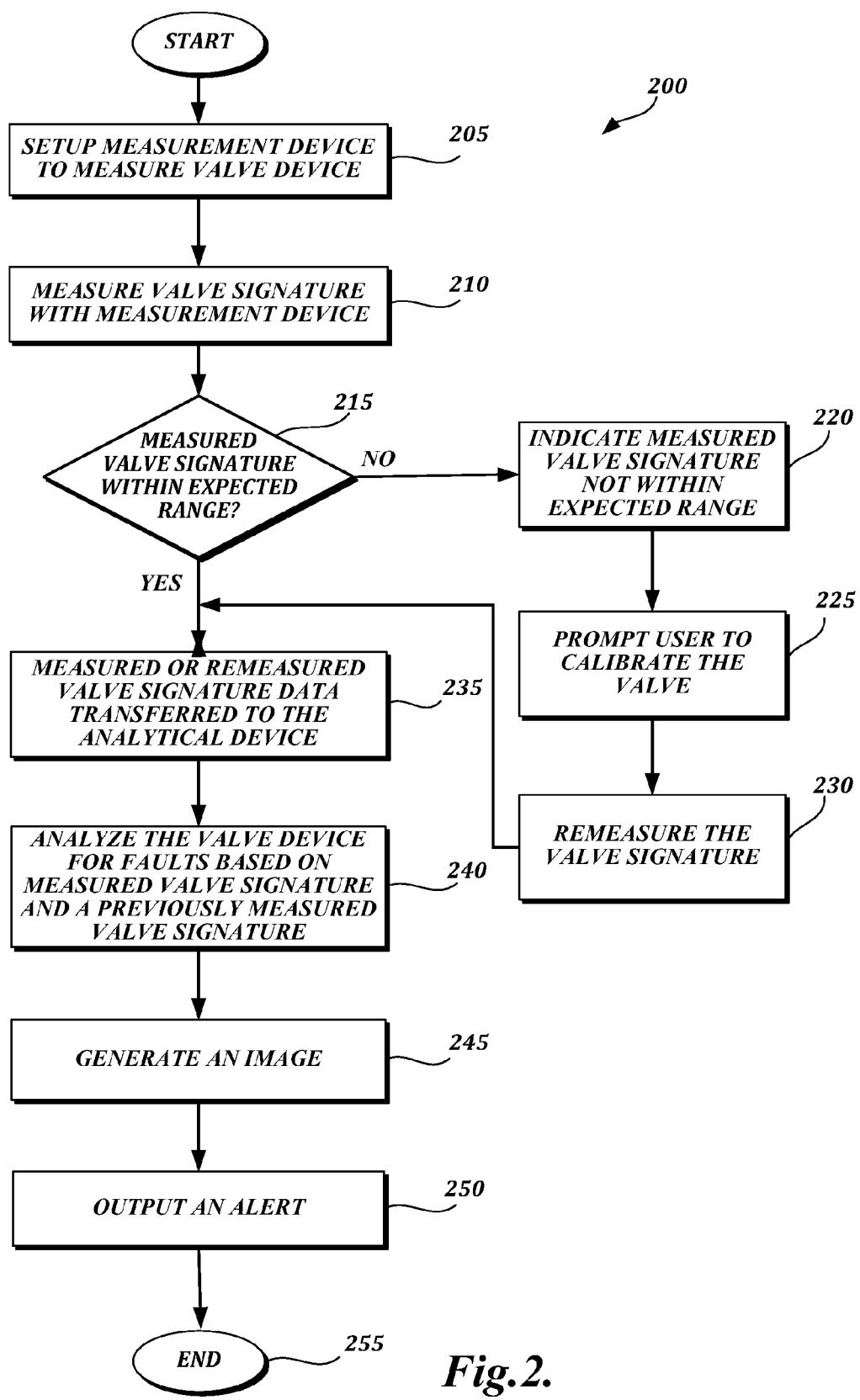
FIG. 2 is a flowchart diagram that depicts an example technique for testing a valve in accordance with one or more embodiments of the present disclosure.

FIG. 2 is a flow diagram illustrating an exemplary process 200 for testing a valve device. The process 200 may be implemented by one or more of the devices included in the system 14, according to one or more embodiments of the present disclosure. At block 205, the measurement device 24 is set up to measure a valve device 102. For example, the measurement device 24 may be connected to inputs or contacts on the valve device 102 via wires. At block 210, a valve signature is measured using the measurement device 24. At block 215, the process determines if the data values in the valve signature are within an expected range of values. Block 215 may be performed by the measurement device 24 or the analytical device 22, or both.

If the measured valve signature data is within the expected range (block 215—YES), the process continues to block 235. If the measured valve signature data is not within the expected range (block 215—NO), the process continues to block 220 where the measurement device 24 provides an indication to the user that that the measured valve signature data is not within the expected range. At block 225, the process 200 may prompt the user to calibrate or recalibrate the valve device 102. In some embodiments, the measurement device 24 provides valve calibration instructions. The prompt or calibration instructions may be in aural, textual, or pictorial format to the user. For example, the calibration instructions may be provided on a display of the measurement device 24. The measurement device 24 may require that the user provide an input to the measurement device 24 to confirm that the valve has been recalibrated. Such a confirmation requirement may help to prevent misdiagnosis of the valve signature data. In some embodiments, the measurement device 24 provides the user with an option to override the re-measurement prompt. At block 230, the valve signature is re-measured.

At block 235, the measured or re-measured valve signature is transferred from the measurement device 24 to the analytical device 26. As discussed above in relation to FIG. 1, for example, the measured or re-measured valve signature and other data may be communicated over a wire or wireless path to the analytical device 22 using currently known or later developed communication protocols or networking technology. In some embodiments, the measured or re-measured valve signature is stored in removable storage (e.g., flash memory embodied as a Secure Digital (SD) Card) included in the storage/memory system 70 of the measurement device 24. The removable storage of the storage/memory system 70 may be removed from the measurement device 24 and manually transferred to the analytical device 22.

Evaluating a valve signature against a previously measured valve signature for the valve device 102, as indicated at block 240, may provide advantages over using valve signature data measured from valve devices other than the valve device 102 because of the many possible differences between valve devices. In addition, using valve signature data that is theoretical rather than empirical may require increased computational or storage resources.

At block 240, the valve device 102 may be analyzed for faults using the analytical device 22 based on the measured or re-measured valve signature data and previously measured valve signature data. The previously measured valve signature data comprises previously measured valve signature data for the valve device 102 or data that is derived therefrom. In some embodiments, the previously measured valve signature data corresponds to a statistical average of previously measured valve signature data for the valve device 102. The previously measured valve signature data may be selected automatically based on, for example, a valve device identifier of measured or re-measured valve signature data. In some embodiments, the particular valve signature data used as the previously measured valve signature data may be selectable by a user. Furthermore, block 240 may be repeated such that the user may select different previously measured valve signature data in order to perform different types of analysis. For example, the user may first analyze the valve device 102 for faults based on measured valve signature data for the valve device 102 from six months prior, and then perform the same analysis for valve signature data from three months prior.

A valve signature image may be generated at block 245. The valve signature image may be generated using the image generating engine 31 of the analytical device 22. The generated valve signature image may include a graphical representation of the measured or re-measured valve signature data. The generated valve signature image may also include a graphical representation of previously measured valve signature data. In some embodiments, the previously measured valve signature data included in the valve signature image includes the previously measured valve signature data from block 245. In some embodiments, block 240 may be repeated based on a user input or automatically based on the analysis performed at block 240. For example, the user may select different valve signature data and the image generating engine 31 generates an updated valve signature image that includes the different valve signature data.

At block 250, an alert may be outputted. The alert may be a general alert that the valve has a fault or needs to be serviced or replaced or the alert may indicate a particular portion of the valve data associated with the fault. At block 255, the process ends.

Figure 4:
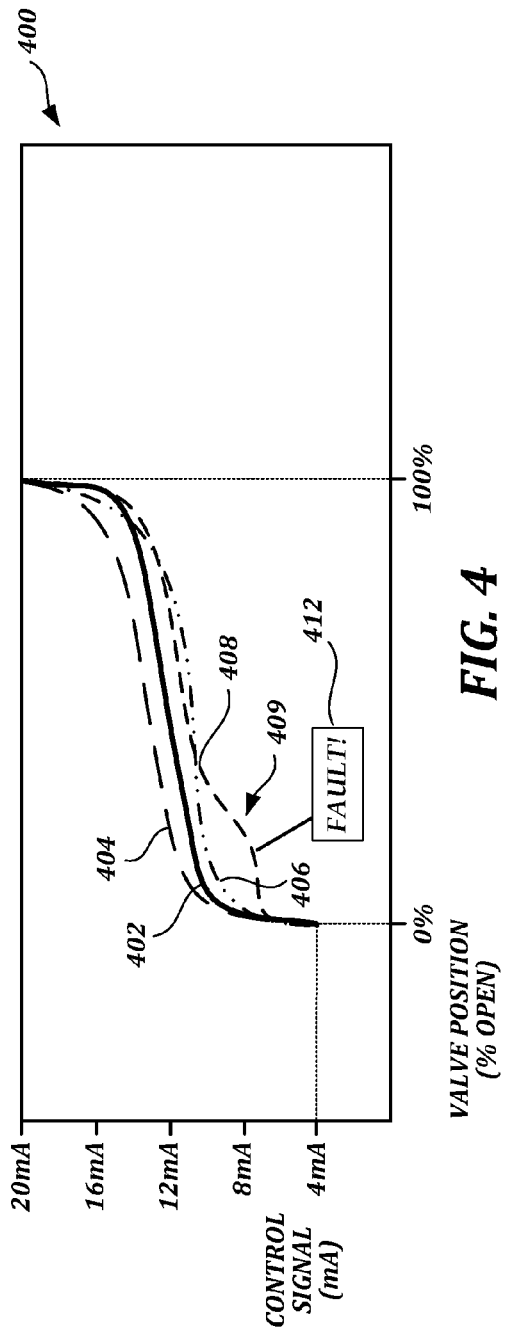
FIG. 4 is an exemplary image that includes a graphical representation of a first valve signature and a second valve signature corresponding to an opening or a closing of a valve that may be generated in accordance with one or more embodiments of the present disclosure.

FIG. 4 shows an example of a valve signature image 400 corresponding to a valve signature for an opening and a closing of the valve device. The valve signature image 400 includes a graphical representation of a first valve signature 402, a second valve signature 404, a third valve signature 406, and a fourth valve signature 408. Each of these valve signatures correspond to different measurement times. The vertical axis is for control signal values (e.g., current in mA) and the horizontal axis corresponds to the valve positions (e.g., % open). It will be appreciated the valve signatures may be depicted using different styles of graphical representation. In some embodiments, the valve signature image 400 includes an alert 412. The alert 412 may be included in the image if a fault is detected using process 200. The alert 412 may be textual or may simply be a color. For example, red or yellow could be displayed based on a severity of the fault.

The first valve signature 402 corresponds to a measured valve signature that is a threshold valve signature and may represent an "ideal" valve signature. The first valve signature 402 may be for a first measurement time when the first valve signature was measured. The first measurement time may be a calibration time when the valve was calibrated or installed. The second valve signature 404 corresponds to a measured valve signature for a second measurement time. The second measurement time may be prior to or after the first measurement time. The second valve signature 404 has a shape that is similar to the first valve signature 402 but, in this illustration, is shifted upwards. This upward shift indicates that higher levels of current were required for the control signals compared to the first measurement time in order to open the valve to particular positions.

The third valve signature 406 corresponds to a measured valve signature for a third time. The third measurement time may be prior to or after the first and/or second measurement time. The third valve signature 406 has a shape that is similar to the second valve signature 404 but is shifted downward. This downward shift indicates that less current was required for the control signals compared to the first or second measurement time, to open the valve to particular positions.

The fourth valve signature 408 corresponds to a measured valve signature for a fourth measurement time. The fourth measurement time may be prior to or after the first, second, and/or third measurement time. The fourth valve signature 408 has a shape that is significantly different at section 409 compared to the first valve signature 402. In this example, this difference has been determined to be a fault and an alert 412 is shown to indicate a fault around section 409 of the fourth valve signature 408.

Figure 5:
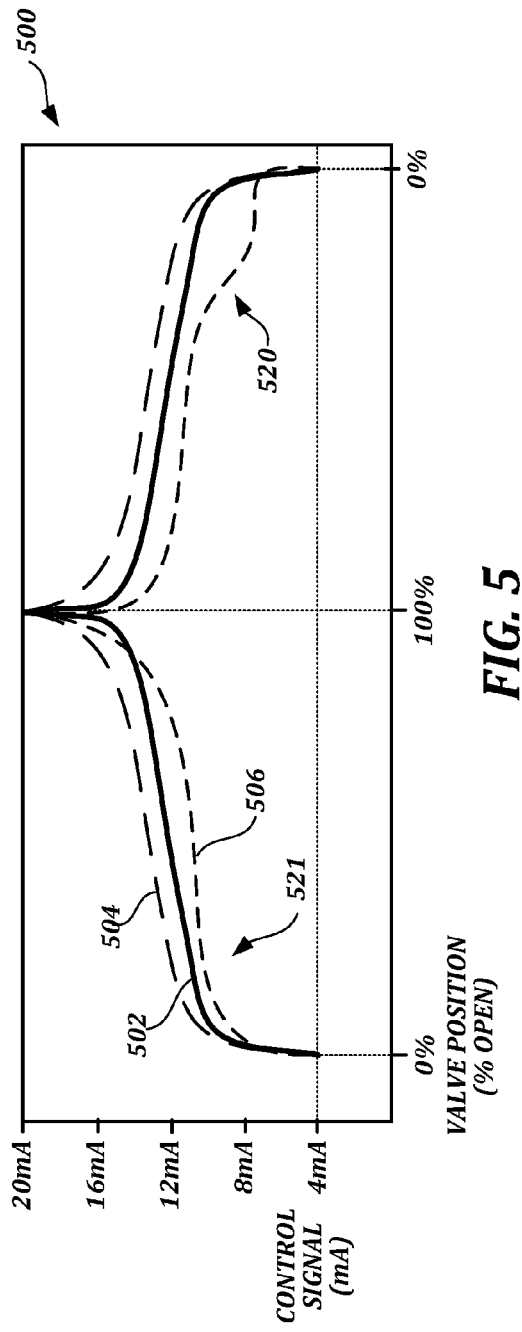
FIG. 5 is an exemplary image that includes a graphical representation of a first valve signature and a second valve signature corresponding to an opening and a closing of the valve that may be generated using one or more embodiments of the present disclosure.

FIG. 5 is an example of a valve signature image 500 corresponding to a valve at positions ranging from closed (0% open) to open (100% open) and back to closed (0% open). It may be desirable to measure an opening and closing of the valve because some abnormalities may only occur during opening or closing. The valve signature image 500 includes a graphical representation of a first valve signature 502, second valve signature 504, and a third valve signature 506. In this example, the vertical axis is for control signal values (e.g., mA) and the horizontal axis corresponds to the valve positions (e.g., % open). It will be appreciated that other types of graphical representations may be utilized. Valve signature image 500 may include an alert, such as the alert 412 discussed above in relation to FIG. 4.

As with the first valve signature 402 in FIG. 4, the first valve signature 502 corresponds to a measured valve signature that is a threshold valve signature and may represent an "ideal" valve signature. The first valve signature 502 may be for a first measurement time when the first valve signature was measured. For example, the first measurement time may be a calibration time when the valve was calibrated or installed. The second valve signature 504 corresponds to a measured valve signature for a second measurement time. The second measurement time may be prior to or after the first measurement time. The second valve signature 504 has a shape that is similar to the first valve signature 502 but, in this example, is shifted upwards. This upward shift indicates that higher levels of current were required for the control signals compared to the first measurement time in order to open and close the valve to particular positions.

The third valve signature 506 corresponds to a measured valve signature for a third measurement time. The third measurement time may be prior to or after the first and/or second measurement time. The third valve signature 506 has a shape that is significantly different at section 520 of the valve closing compared to the first valve signature 502 and to a corresponding valve opening section 521 of the third valve signature 506. In some embodiments, section 520 may be indicated by an alert.

The valve signature images 400 or 500 may be generated using the analytical device 22 or an analytical device such as an analytical device disclosed in FIG. 3, for example and without limitation. The valve signature images 400 and 500 may be displayed to a user of the analytical device 22 or may be transmitted to another device.

EXTENSIONS AND ALTERNATIVES

Many alternatives to and extensions of the systems and devices described herein are possible. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios.

Many alternatives to and extensions of the user interfaces described herein are possible. In practice, the user interfaces described herein may be implemented as separate user interfaces or as different states of the same user interface, and the different states can be presented in response to different events, e.g., user input events. The elements shown in the user interfaces can be modified, supplemented, or replaced with other elements in various possible implementations.

The methods, such as methods 200 and 600, disclosed herein may be implemented as instructions included in a non-transitory computer readable storage medium. In response to execution of these instructions by one or more computing devices, these instructions may cause the one or more computing devices to carry out the methods.

The term "or" as used herein is generally intended to mean "and/or," having both conjunctive and disjunctive meanings (and is not confined to an "exclusive or" meaning), unless otherwise indicated.

As used herein, the terms "a," "an," and "the" include plural references unless the context clearly dictates otherwise. Also as used herein, the meaning of "in" includes "in" and "on" unless the context clearly dictates otherwise.

In addition, many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As yet another example, processing stages that are described as being performed in a series of steps may instead be handled in a parallel fashion, with multiple modules or software processes concurrently handling one or more of the illustrated processing stages. As still another example, processing stages that are indicated as being performed by a particular device or module may instead be performed by one or more other devices or modules.

In the preceding description, numerous specific details were set forth in order to provide a thorough understanding of one or more embodiments of the present disclosure. It will be apparent to one skilled in the art, however, that many embodiments of the present disclosure may be practiced without some or all of the specific details. It will be appreciated that changes can be made therein without departing from the spirit and scope of the disclosure. In some instances, well-known process steps have not been described in detail in order not to unnecessarily obscure various aspects of the present disclosure. Additionally, it will The embodiments of the invention in which an exclusive property or privilege is claimed are defined as follows:

1. A method of testing a valve, the method comprising:
communicating, by a portable measurement device, a sequence of control signals to the valve to cause adjustment of a position of the valve, wherein the sequence of control signals is communicated to the valve at a first measurement time;
receiving first valve signature data for the valve corresponding to the first measurement time, wherein the first valve signature data includes data values representing positions of the valve resulting from the sequence of control signals communicated to the valve;
receiving second valve signature data for the valve corresponding to a second measurement time, wherein the second valve signature data includes data values representing positions of the valve that result from communication of the sequence of control signals to the valve at the second measurement time; and
evaluating operation of the valve by determining differences between the data values of the first valve signature data and the data values of the second valve signature data.

2. The method of claim 1, further comprising generating an image comprising a graphical representation of at least a portion of the first valve signature data and a graphical representation of at least a portion of the second valve signature data.

3. The method of claim 2, wherein the graphical representation of the first valve signature data and the graphical representation of the second valve signature data are overlaid on one another.

4. The method of claim 1, wherein the second measurement time occurs prior to the first measurement time.

5. The method of claim 1, wherein the second valve signature data comprises a valve signature for the valve when the valve is properly calibrated.

6. The method of claim 1, further comprising determining whether the valve has a fault based on determined differences between the first valve signature data and the second valve signature data.

7. The method of claim 1, further comprising, prior to receiving the first valve signature data, calibrating the valve.

8. The method of claim 1, wherein the sequence of control signals corresponds to at least one of an opening and a closing of the valve.

9. The method of claim 1, further comprising determining whether the valve is calibrated based on determined differences between the first valve signature data and the second valve signature data.

10. The method of claim 9, wherein the second valve signature data includes one of:
an initial measured valve signature for the valve; and
an average of previously measured valve signatures of the valve.

11. A non-transitory computer readable storage medium having computer-executable instructions included thereon, wherein the instructions, in response to an execution by one or more computing devices, cause the one or more computing devices to carry out the method of claim 1.

12. A system for testing a valve, the system comprising:
a portable measurement device configured to:
measure first valve signature data by causing a plurality of control signals to be input to the valve at a first measurement time and receiving data values that represent valve positions of the valve corresponding to the plurality of control signals; and
measure second valve signature data by causing the plurality of control signals to be input to the valve at a second measurement time and receiving data values that represent valve positions of the valve corresponding to the plurality of control signals; and
an analytical device configured to receive and analyze at least a portion of the first valve signature data to evaluate operation of the valve by comparing data values of at least a portion of the first valve signature data with data values of at least a portion of the second valve signature data.

13. The system of claim 12, wherein the portable measurement device is further configured to transmit the first valve signature data to the analytical device, and
wherein the analytical device is remotely located from the portable measurement device.

14. The system of claim 12, wherein the plurality of control signals are configured to set a position of the valve to about 0% open, and then incrementally adjust the position of the valve until the valve is about 100% open, and then incrementally adjust the position of the valve back to about 0% open.

15. The system of claim 12, wherein the plurality of control signals are configured to set a position the valve to about 100% open and then incrementally adjust the position of the valve until the valve is about 0% open, and then incrementally adjust the position of the valve back to about 100% open.

16. The system of claim 12, wherein the analytical device is further configured to determine that the valve has a fault based on the comparison of the first valve signature data and the second valve signature data.

17. The system of claim 12, wherein a storage of the analytical device includes a set of valve signature data corresponding to a plurality of measurement times for the valve, wherein each valve signature data in the set corresponds to a measurement performed at a different measurement time,
wherein second valve signature data is selected from the set of valve signature data in response to a user input, and
wherein the analytical device is configured to generate an image that includes a graphical representation of the first valve signature data and the second valve signature data.

18. The system of claim 12, wherein the analytical device is a portable device.

19. The system of claim 12, wherein the portable measurement device is further configured to output a prompt to calibrate the valve based on the comparison of the first valve signature data and the second valve signature data.

20. A system for testing a valve, the system comprising:
a measurement device configured to:
communicate a sequence of control signals to the valve at a first measurement time to cause adjustment of a position of the valve and in response thereto, receive first valve signature data for the valve, wherein the first valve signature data includes data values representing positions of the valve resulting from the sequence of control signals communicated to the valve;
evaluate the first valve signature data to determine whether the data values in the first valve signature data are within an expected range of values, and when the data values in the first valve signature data are not within the expected range of values, provide a valve calibration instruction; and re-measure the valve signature data after calibration of the valve in response to the valve calibration instruction, by communicating the sequence of control signals to the valve and in response thereto, receiving re-measured valve signature data for the valve, wherein the re-measured valve signature data includes data values representing positions of the valve resulting from the sequence of control signals communicated to the valve.

21. The system of claim 20, further comprising an analytical device configured to:

receive the first valve signature data or the re-measured valve signature data from the measurement device; and evaluate the first valve signature data or the re-measured valve signature data against a previously-measured valve signature for the valve.

22. The system of claim 21, wherein the analytical device is further configured to determine whether the valve has a fault based on the evaluation of the first valve signature data or the re-measured valve signature data against the previously-measured valve signature for the valve.

23. The system of claim 21, wherein the analytical device is further configured to receive user-selection of the previously-measured valve signature for the valve.

24. The system of claim 23, wherein the analytical device receives user-selection of multiple previously-measured valve signatures for the valve and determines whether the valve has a fault based on evaluation of the first valve signature data or the re-measured valve signature data against the multiple previously-measured valve signatures.

* * * * *